United States Patent
Brink

(10) Patent No.: US 8,308,402 B2
(45) Date of Patent: Nov. 13, 2012

(54) DRILL BODY FOR CHIP REMOVING MACHINING

(75) Inventor: Magnus Brink, Åmotsbruk (SE)

(73) Assignee: Sandvik Intellectual Property AB, Sandviken (SE)

( * ) Notice: Subject to any disclaimer, the term of this patent is extended or adjusted under 35 U.S.C. 154(b) by 966 days.

(21) Appl. No.: 12/153,318

(22) Filed: May 16, 2008

(65) Prior Publication Data

US 2008/0298918 A1    Dec. 4, 2008

(30) Foreign Application Priority Data

May 29, 2007    (SE) ..................................... 0701305

(51) Int. Cl.
  *B23B 51/02*    (2006.01)
(52) U.S. Cl. ........................................ 408/230; 408/227
(58) Field of Classification Search ................. 408/229, 408/230, 227
  See application file for complete search history.

(56) References Cited

U.S. PATENT DOCUMENTS

| | | | | |
|---|---|---|---|---|
| 2,769,355 | A | * | 11/1956 | Crisp ............................ 408/230 |
| 4,605,347 | A | | 8/1986 | Jodock et al. |
| 5,160,232 | A | | 11/1992 | Maier |
| 5,273,380 | A | * | 12/1993 | Musacchia .................... 408/230 |
| 5,931,615 | A | * | 8/1999 | Wiker ........................... 408/230 |
| 6,012,881 | A | | 1/2000 | Scheer |
| 6,585,460 | B1 | | 7/2003 | Meece et al. |
| 6,988,859 | B2 | | 1/2006 | Borschert et al. |
| 2003/0039522 | A1 | | 2/2003 | Yanagida et al. |
| 2003/0175086 | A1 | | 9/2003 | Muhlfriedel et al. |
| 2005/0249562 | A1 | * | 11/2005 | Frejd ............................. 408/230 |
| 2006/0285935 | A1 | | 12/2006 | Lin |

FOREIGN PATENT DOCUMENTS

| | | | |
|---|---|---|---|
| DE | 3336018 A1 | * | 4/1985 |
| DE | 102 005 012 026 A | | 9/2006 |
| FR | 973 672 A | | 2/1951 |
| JP | 60048207 A | * | 3/1985 |
| JP | 60056809 A | * | 4/1985 |
| JP | 01011703 A | * | 1/1989 |
| JP | 2004082302 A | * | 3/2004 |
| JP | 2005001082 A | * | 1/2005 |
| JP | 2005052939 A | * | 3/2005 |
| JP | 2005238349 A | * | 9/2005 |
| SE | 528 156 | | 9/2006 |
| WO | WO 2005030418 A1 | * | 4/2005 |

* cited by examiner

*Primary Examiner* — Daniel Howell
*Assistant Examiner* — Paul M Janeski
(74) *Attorney, Agent, or Firm* — Morgan, Lewis & Bockius LLP

(57) ABSTRACT

A drill body for chip removing machining, including an envelope surface which is concentric with a center axis around which the drill body is rotatable, and transforms into a front end surface, and a front cutting edge adjacent to a chip flute which is countersunk in the envelope surface in the area in front of the cutting edge as viewed in the direction of rotation of the drill body and runs out into the front end surface. In the front part of the chip flute, a depression is formed, which includes two part surfaces extending at an obtuse angle ($\alpha$) to each other, one of which forms a bottom surface in the depression, and the other of which faces the cutting edge and is in front of the cutting edge as viewed in the direction of rotation to form a stop face for a chip removed by the cutting edge.

10 Claims, 3 Drawing Sheets

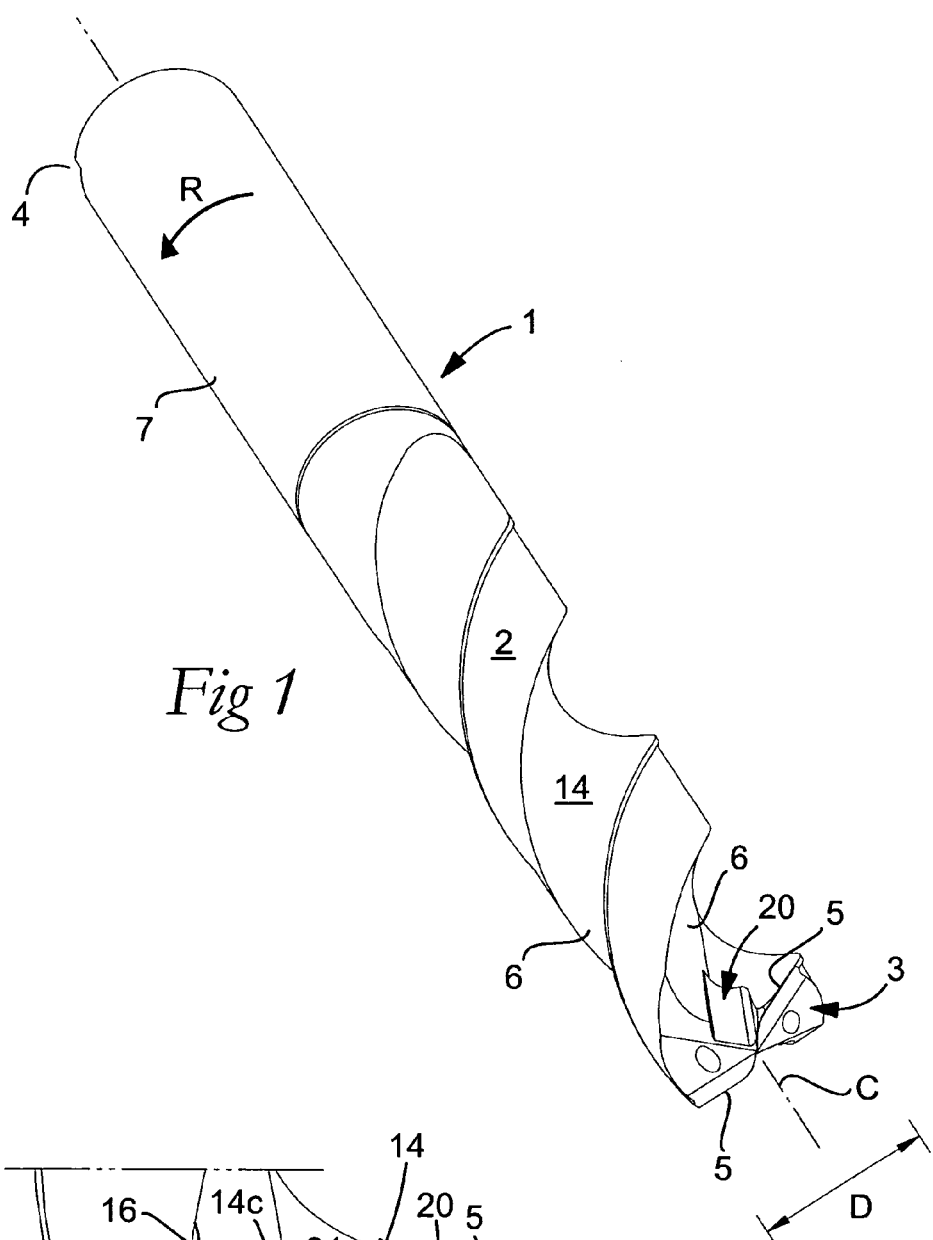
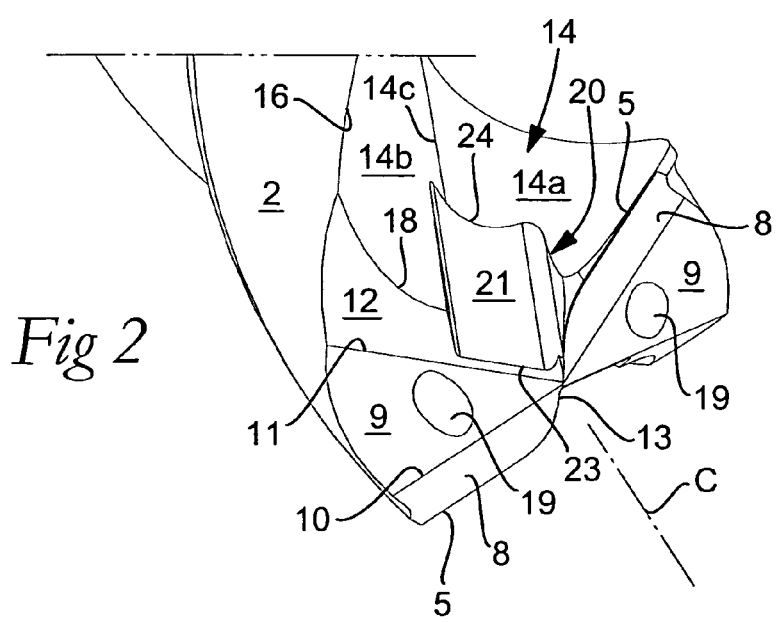

DRILL BODY FOR CHIP REMOVING MACHINING

This application claims priority under 35 U.S.C. §119 to Swedish Patent Application No. 0701305-5, filed on May 29, 2007, which is incorporated by reference herein in its entirety.

FIELD OF THE INVENTION

The present invention relates generally to a drill body of the type that includes an envelope surface, which is concentric with a center axis around which the drill body is rotatable, and transforms into a front end surface, and a front cutting edge adjacent to a chip flute, which is countersunk in the envelope surface, more precisely, in the area in front of the cutting edge as viewed in the direction of rotation of the drill body, and runs out into the front end surface. In practice, such drill bodies are used for hole making by chip removing machining in workpieces of metal, such as steel and steel alloys, aluminum, cast iron, titanium, etc.

BACKGROUND OF THE INVENTION

Drill bodies of the type generally mentioned above may be divided into two main categories, viz., on one hand, more or less long narrow bodies, which themselves form complete, usable drilling tools, and on the other hand fairly short attachments, which are connected with longer bodies in order to form, together with the same, complete drilling tools. Such a connection may be permanent, the entire drill being discarded after wear of the cutting edges, alternatively semi-permanent, e.g., by soldering, or detachable, the drill body in question forming a wear body or a so-called loose top, which simply may be replaced after wear and allow long-term use of a carrying basic body.

Drills and drill bodies may be divided into different categories also in other respects. Thus, some drills may have a symmetrical geometry by including two or more identical cutting edges that are equi-angularly spaced-apart, while others have an asymmetrical geometry by including a number of cutting inserts that differ from each other in respect of the radial positions thereof and/or the shape thereof. Furthermore, some drills are formed with entirely or partly helicoidal and cross-sectionally concave chip flutes (twist drills), while others again are formed with straight chip flutes that are delimited by plane limiting surfaces.

Common to all types of drills is the axiomatic fact that the individual cutting edge, which provides for chip removal out of the blank or workpiece, is situated in or adjacent to the wall in the front part of the chip flute that forms a rear part surface in the chip flute, as viewed in the direction of rotation of the drill. When the chip is removed from the bottom of the hole to be made, the chip is therefore contained in a hollow space that is delimited by the limiting surface of the chip flute as well as by the cylindrical hole wall generated during the drilling. The purpose of the chip flute is to evacuate the released chip from the hole in the best way while avoiding chip jamming and other disturbing phenomena. For this reason, it is desirable that the chip, as far as possible, is brought to move axially through the chip flute. However, the chip does not have an inherent tendency to move axially, but has to be pressed by compulsion through the chip flute. The so-called start chip—generated by, for instance, a pointed, symmetrical twist drill, the chip flutes of which are helicoidal—that is, the front part of the chip initially generated upon engagement or entering, is reasonably narrow, whereupon the width of the chip grows until the cutting edges attain full engagement. This full chip obtains a helicoidal or hair-lock-like shape, the diameter of which is determined by the cross-section area of the flute space that is delimited by the hole wall as well as by the concave limiting surface of the chip flute. Just the start chip has no natural tendency to move axially. On the contrary, the same tends to be pressed out radially and deflect against the hole wall, which causes poor chip control.

Different embodiments of chip flutes of drills are disclosed in, for instance, U.S. Pat. No. 6,988,859 B2, U.S. Patent Application Publication No. 2003/0175086 A1, and Swedish Patent No. 528156 C2, which show symmetrical twist drills having two cutting edges and two helicoidal chip flutes. Common to these previously known drills is that the individual chip flutes run with one and the same generally concave cross-section shape up to the front end surface into which they transform via smoothly rounded borderlines. The concave cross-section shape is primarily determined by the profile shape of the grinding disc used to provide the chip flute. The grinding of the chip flutes aims at allowing the chip to slide with the peripheral, helicoidal outer edge thereof along the ground surface as frictionless as possible. In this connection, the chip flutes of certain types of drills are even polished to decrease the frictional resistance. However, a disadvantage of the previously known drills is that they present a mediocre, initial chip control so far that the narrow start chip tends to be pressed out toward the hole wall, i.e., move radially rather than axially. It may even happen that the chip is wedged in between the hole wall and the cylindrical envelope surface of the drill body.

The present invention aims at obviating the above-mentioned disadvantage of previously known drill bodies and at providing an improved drill body.

An object of the invention to provide a drill body that ensures a good, initial chip control and therefore reduces the risk of the emergence of disturbing phenomena, such as chip jamming or the start chip penetrating in between the hole wall and the envelope surface of the drill body.

SUMMARY OF THE INVENTION

In an embodiment, the invention provides a drill body for chip removing machining, including an envelope surface which is concentric with a center axis around which the drill body is rotatable, and transforms into a front end surface, and a front cutting edge adjacent to a chip flute which is countersunk in the envelope surface in the area in front of the cutting edge as viewed in the direction of rotation of the drill body and runs out into the front end surface. In the front part of the chip flute, a depression is formed, which includes two part surfaces extending at an obtuse angle (a) to each other, one of which forms a bottom surface in the depression, and the other of which faces the cutting edge and is in front of the cutting edge as viewed in the direction of rotation to form a stop face for a chip removed by the cutting edge.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a drill body according to the invention realized in the form of a twist drill;

FIG. 2 is an enlarged, perspective detailed section illustrating the front end or tip of the drill body;

DETAILED DESCRIPTION OF THE PREFERRED EMBODIMENTS

Figure 3:
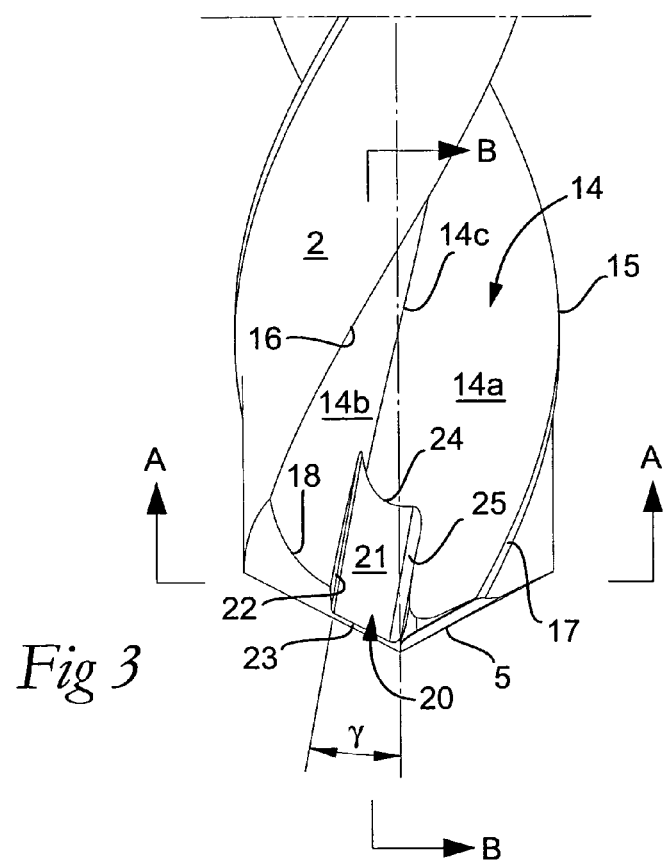
FIG. 3 is a partial side view of the front part of the drill body.
Figure 4:
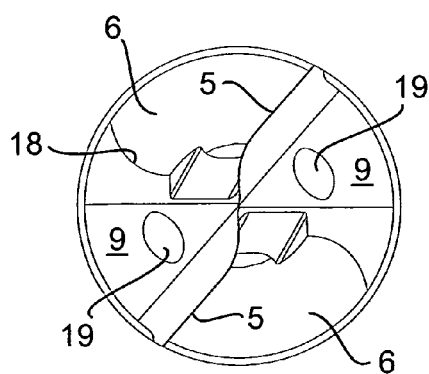
FIG. 4 is an end view from the front of the drill body.
Figure 5:
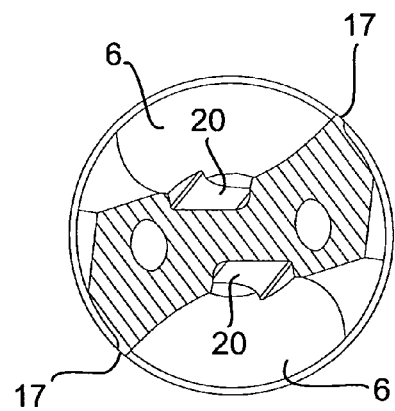
FIG. 5 is a section A-A in FIG. 3.

The drill body 1 exemplified in FIG. 1 is in the form of a twist drill having a rotationally symmetrical, substantially cylindrical basic shape. In this case, the body is solid and includes an envelope surface 2, which extends between front and rear ends 3, 4. The envelope surface 2 is concentric with a center axis C around which the body is rotatable, more precisely, in the direction of rotation R. In front, the drill body includes a so-called tip, which includes two cutting edges 5 from which chip flutes 6 extend in the backward direction along the body. More precisely, the chip flutes extend from the tip to an end at a rear, cylindrical fixing part 7. In practice, the shown drill body, which forms a complete, usable drill, may have a length that amounts to 3-8 times the diameter (D) thereof.

The front end, designated 3, of the drill body is represented by an end surface that includes a number of part surfaces, which are pair-wise identical and therefore only described in connection with one of the cutting edges 5. Behind the individual cutting edge 5, a primary clearance surface 8 is thus formed (see FIG. 2), which has a moderate clearance angle and transforms into a secondary clearance surface 9 having a larger clearance angle, more precisely, via a borderline 10. Via an additional borderline 11, the secondary clearance surface 9 transforms into a third clearance surface 12, which leans even steeper than the secondary clearance surface 9. In the example, the two cutting edges 5 are straight and transform into each other via a generally S-shaped chisel edge 13 in which there may be included a centering punch (invisible to the eye) situated exactly along the center axis C.

The individual chip flute 6 is countersunk in the envelope surface 2 and extends in this case helicoidally around the center axis C. More precisely, the individual chip flute has a concave cross-section shape and is delimited by a smoothly rounded limiting surface 14, which extends between outer limiting edges 15, 16. Among these, the edge 15 forms a primary edge, which is connected to the cutting edge 5 and consists of a so-called guide bar, in which a narrow clearance surface 17 is included. In practice, the primary edge or guide bar 15 is sharpened and has a diameter that is somewhat larger than that of the secondary limiting edge 16. By virtue of the concave, generally U-like cross-section shape thereof, the chip flute 14 includes two sides or halves facing each other, viz. a so-called primary part surface 14a adjacent to the primary limiting edge 15, as well as a secondary part surface 14b adjacent to the secondary limiting edge 16. A borderline between said part surfaces 14a, 14b is designated 14c. At the front end thereof, the individual chip flute 6 runs out into the front end surface of the drill body. More precisely, the primary part surface 14a ends into the cutting edge 5, while the opposite, secondary part surface 14b runs out into the third clearance surface 12 of the end surface 3 via a curved borderline 18.

Two cooling-liquid ducts 19 mouth in the secondary clearance surfaces 9. The cooling-liquid ducts extend helicoidally through the drill body to the rear end 4 thereof, in which they end into inlets (not visible), which may be connected to a cooling liquid source in the machine in which the drill body is applied.

Figure 6:
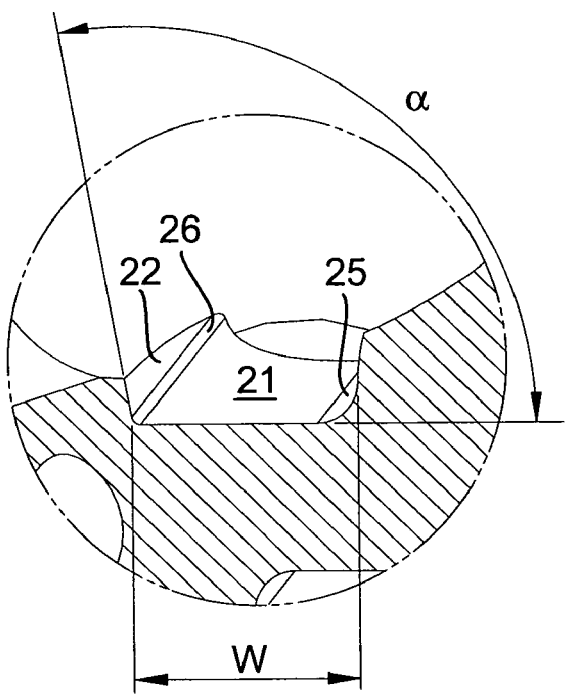
FIG. 6 is an additionally enlarged detailed section, showing a portion of the tip.

According to an embodiment of the invention, a depression 20 is formed in the front part of the individual chip flute 6 (see FIGS. 2, 3 and 6), which includes two part surfaces 21, 22 extending at an obtuse angle to each other, one of which forms a bottom surface 21 in the depression, and the other one of which faces the cutting edge 5 in order to form a stop face 22 for the chip removed by the cutting edge. In the shown embodiment, the depression 20 has the shape of a chute, which runs out into the end surface 3 of the drill body and has a successively increasing depth toward the same. More precisely, the chute runs out into the third clearance surface 12 into which it transforms via a straight borderline 23. At the rear end thereof, the chute runs into the chip flute via a borderline 24, which is curved as a consequence of the concave or arched shape of the chip flute 6.

In practice, the chute 20 is preferably formed by grinding by a grinding disc, the profile shape of which determines the cross-section shape of the chute. In doing so, the grinding disc is inserted as deep into the material that the chute also will include a third part surface 25 opposite the stop face 22. In the embodiment shown, the grinding is carried out linearly, the part surfaces 22, 25 running straight and the bottom surface 21 becoming plane.

As is clearly seen in FIG. 3, the chute 20 is situated beside the cutting edge 5 and does not interfere with the same.

The angle $\alpha$ (see FIG. 6) between the bottom surface 21 of the chute and the stop face 22 should be obtuse, but amount to at most 135°. In practice, an obtuse angle $\alpha$ of at most 110° is preferred. The width W of the chute should not be less than 0.1×D (the drill diameter) and amount to at most 0.3×D. The transition 26 between the stop face 22 and the bottom surface 21 has advantageously the shape of a linear inner edge in the form of a radius transition having a minimum radius.

Figure 7:
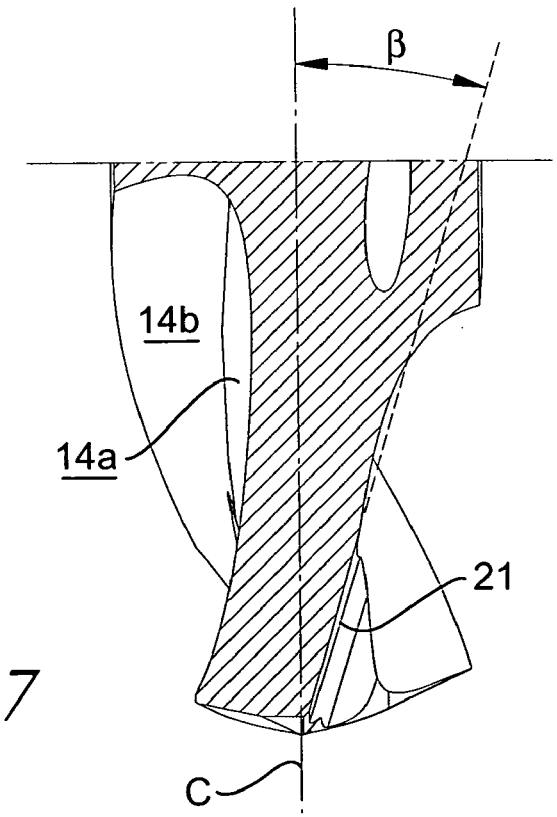
FIG. 7 is a partial longitudinal section B-B in FIG. 3.

As is seen in FIG. 7, the bottom surface 21 of the chute runs at an acute angle $\beta$ to the center axis C of the drill body. Angle $\beta$ should amount to at least 10° and at most 50°. Advantageously, the angle $\beta$ is within the range of 15-30°. In the example, $\beta$ is 16°.

Also in a plane at an angle of 90° to the plane according to FIG. 7, the bottom surface of the chute is inclined in relation to the center axis of the drill body, as is seen in FIG. 3. Thus, the length extension of the chute, such as defined by the radius transition 26, forms an acute angle $\gamma$ with center axis C. This acute angle should not be more than 30°, and may advantageously be within the range of 5-20°.

In the example, the obtuse angle between the two converging cutting edges 5 of the drill body amounts to 122°. In practice, this angle (the nose angle of the drill) may vary upward as well as downward. Of course, the angle between the cutting edges is of great importance for the chip formation. Therefore, it should be emphasized that the geometry and location of the chute 20 in the instant embodiment is adapted to the very nose angle of 122°.

When the drill, by being brought to rotate and simultaneously imparted a linear, axial feeding motion, enters a workpiece, a start chip is removed, which initially is generated by the central chisel edge 13 and then by successively greater and greater portions of the main cutting edges 5. Therefore, initially, the chip becomes narrow and has a minimum diameter, so as to subsequently become wider and wider and form a helicoidal configuration with increasing diameter. When full engagement is attained, i.e., when the cutting edges 5 remove a chip along the entire length thereof, the individual chip is compressed in an appurtenant chip flute and is pressed rearward in the flute space that is delimited by the hole wall as well as the limiting surface 14 of the chip flute. When the start chip is generated, the same will not be able to slide freely along the limiting surface of the chip flute, but will meet the stop face 22 of the chute 20 and also the bottom surface 21 thereof. In this connection, the stop face 22, and to a certain extent also the bottom surface 21, will guide the chip in the direction backward/inward toward the center of the chip flute, instead of radially toward the secondary limiting edge 16 of the chip flute. In other words, the chute 20 ensures instant chip control by imparting to the start chip a tendency to move axially, rather than radially.

The invention is not limited only to the embodiments described above and shown in the drawings. Thus, the guiding stop face may also be formed in a depression at a certain distance from the front end surface of the drill body. In other words, the depression does not necessarily need to be in the form of a chute that runs out into the end surface. Furthermore, the part surfaces of the depression or chute may be modified in various ways. For instance, the bottom surface may be given a slightly arched, convex shape (so far that the edges thereof become arched), instead of the plane shape shown. As pointed out by way of introduction, the drill body may also be a short wear body or loose top, which via a suitable interface can be detachably connected to a carrying basic body. The invention may also be applied to drills having an arbitrary number of cutting edges and chip flutes, wherein the last-mentioned ones may be helicoidal as well as straight. In conclusion, it should also be made clear that the invention may be applied not only to short-hole drills, but also to long-hole drills in which the drill body is coupled to a very long shank.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drill body for chip removing machining, comprising:
   an envelope surface which is concentric with a center axis around which the drill body is rotatable, and transforms into a front end surface; and
   a front cutting edge adjacent to a chip flute which is countersunk in the envelope surface in the area in front of the cutting edge as viewed in the direction of rotation of the drill body and runs out into the front end surface,
   wherein, in the front part of the chip flute rearward of the front end surface, a depression is formed without interfering with the front cutting edge, which includes two part surfaces extending at an obtuse angle ($\alpha$) to each other, one of which forms a bottom surface in the depression, and the other of which faces the cutting edge and is in front of the cutting edge as viewed in the direction of rotation to form a stop face for a chip removed by the cutting edge,
   wherein the chip flute is helicoidal and delimited by a cross-sectionally concave limiting surface to which the depression is delimited via a curved borderline,
   wherein the concave limiting surface includes two halves facing each other, one of the two halves ending into the front cutting edge, and
   wherein the depression extends into the one of the two halves ending into the front cutting edge.

2. The drill body according to claim 1, wherein the depression is in the form of a chute, which runs out into the end surface and has a successively increasing depth toward the end surface.

3. The drill body according to claim 1, wherein the stop face and the bottom surface abut each other via a linear inner edge.

4. The drill body according to claim 1, wherein the obtuse angle ($\alpha$) between the stop face and the bottom surface amounts to at most 135°.

5. The drill body according to claim 1, wherein the obtuse angle ($\alpha$) between the stop face and the bottom surface amounts to at least 110°.

6. The drill body according to claim 1, wherein the depression is provided by grinding by a grinding disc and delimited by not only the stop face and the bottom surface, but also a third part surface facing the stop face.

7. The drill body according to claim 2, wherein the bottom surface of the chute and the center axis of the drill body mutually form an angle ($\alpha$) within the range of 10-50°.

8. The drill body according to claim 2, wherein the stop face of the chute runs at an acute angle of at most 30° in relation to the center axis of the drill body.

9. The drill body according to claim 1, having a symmetrical basic shape and comprising two chip-removing cutting edges, which converge into a center cutting edge, as well as two chip flutes, wherein each one of the two chip flutes includes a front depression having a chip-guiding stop face.

10. The drill body according to claim 1, wherein the depression extends into both of the two halves of the concave limiting surface and has a width W satisfying an equation $0.1 \times D \leqq W \leqq 0.3 \times D$, where D is a diameter of the drill body.

* * * * *